(12) United States Patent
Kaufmann

(10) Patent No.: US 6,537,669 B1
(45) Date of Patent: Mar. 25, 2003

(54) DEVICE AND METHOD FOR IN-MOLD COMPRESSION AND/OR IN-MOLD INJECTION AND FOR EDGING A DECORATIVE MATERIAL WITH A SUPPORTING MATERIAL

(76) Inventor: Georg Kaufmann, Steinäckerstrasse Zc, CH-5442 Fislisbach (CH)

( * ) Notice: Subject to any disclaimer, the term of this patent is extended or adjusted under 35 U.S.C. 154(b) by 0 days.

(21) Appl. No.: 09/646,179
(22) PCT Filed: Mar. 17, 1999
(86) PCT No.: PCT/CH99/00117
  § 371 (c)(1),
  (2), (4) Date: Sep. 14, 2000
(87) PCT Pub. No.: WO99/47328
  PCT Pub. Date: Sep. 23, 1999

(30) Foreign Application Priority Data

Mar. 19, 1998 (CH) ................................................ 0667/98

(51) Int. Cl.⁷ .................................................. B32B 9/04
(52) U.S. Cl. ..................... 428/411.1; 428/495; 428/522; 425/111; 425/112; 425/125; 264/299; 264/275; 264/316; 264/319; 264/320; 264/328.1
(58) Field of Search ............................ 428/411.1, 495, 428/522; 425/111, 112, 125; 264/299, 275, 316, 319, 320, 328.1

(56) References Cited

U.S. PATENT DOCUMENTS 5,759,588 A * 6/1998 Harada ........................ 425/111

FOREIGN PATENT DOCUMENTS

| DE | 40 38 172 | | 6/1992 |
|---|---|---|---|
| EP | 773098 | * | 5/1997 |
| FR | 1496387 | | 8/1967 |
| GB | 2103534 | * | 2/1983 |
| GB | 2236705 | * | 9/1990 |
| GB | 2 236 705 | | 4/1991 |
| GB | 0 680 712 | | 11/1995 |
| NL | 67355 | | 2/1951 |

* cited by examiner

Primary Examiner—Leszek Kiliman
(74) Attorney, Agent, or Firm—Venable; Norman N. Kunitz

(57) ABSTRACT

An apparatus and a process for the compression and/or injection in-mold lamination of a decorative material (1) and for the complete bordering of at least part of the edge (2) of this decorative material with a backing material (3) are proposed. The apparatus comprises at least two mold parts—forming a cavity (4). A first mold part (5) comprises pressing means (7) and a second mold part (6) comprises holding means (8) for holding a decorative material (1), placed into the cavity (4, 4'), at a distance from a surface (9) of the cavity formed by the second mold part (6), these holding means (8) being arranged raised with respect to this surface (9), entirely within the cavity (4, 4') and immovably with respect to the surface (9) of the latter. The apparatus is characterized in that the holding means (8) are arranged entirely within the cavity (4, 4') and immovably with respect to the surface (9) of the latter and in that the pressing means (7) are designed and arranged such that the decorative material (1) is pressed by them onto the holding means (8)—at least in the vicinity of the edge (2)—at least during the compression and/or injection in-mold lamination.

26 Claims, 4 Drawing Sheets

Fig. 9A                    Fig. 9B

DEVICE AND METHOD FOR IN-MOLD COMPRESSION AND/OR IN-MOLD INJECTION AND FOR EDGING A DECORATIVE MATERIAL WITH A SUPPORTING MATERIAL

BACKGROUND OF THE INVENTION

The invention relates to the bordering of a decorative material, or at least part of the edge of the same, by using compression and/or injection in-mold lamination with a backing material. Serving for carrying out the process is an apparatus which comprises at least two mold parts—forming a cavity. According to a first aspect, the invention relates to an apparatus corresponding to the precharacterizing clause of the independent claim 1. According to a second aspect, the invention relates to a process for compression or injection in-mold lamination corresponding to the precharacterizing clause of the independent claim 13 or 15, respectively.

In many areas of technology, use is made of components made of plastic which, apart from functional requirements, also have to meet esthetic demands. Automotive engineering may be mentioned as one example of many such areas, such plastic components being used here for interior trim, parcel shelves, removable interior trunk lids, dashboards and the like. To design these in an esthetically pleasing form, a decorative layer is therefore often applied to a visible side of the plastic component as a separate surface layer. For reasons of unproblematical disposal or simplified reuse, the decorative material should preferably be produced from the same material as the supporting plastic component. Such single-substance materials can be recycled much more cost-effectively than mixed materials, which first have to be separated. For producing such plastic components, the so-called compression in-mold lamination or back compression molding process was developed. This process is described in the publication "Kunststoffe im Automobilbau" [plastics in automotive engineering], VDI-Verlag GmbH, Dusseldorf 1994. It provides that a decorative layer is fastened on an upper mold part of an opened mold, the parts of which form a cavity, in such a way that it covers the surface of the upper mold part, or the surface of the cavity, if appropriate over the full surface area. Subsequently, a molten and therefore flowable plastics compound is injected into the still opened mold, for example by means of the melt-flow method, or is placed in it by means of the layer application method. After that, the mold is closed, whereby the plastics compound is distributed uniformly in the cavity of the mold under the closing pressure, and, at least in the case of decorative materials with pores, such as for example in the case of textile materials, penetrates partly into the decorative material. A decorative material may also fuse at its surface with the backing material. The plastics compound subsequently solidifies and thereby enters into an intimate bond with the decorative layer. This compression in-mold lamination process may also be combined with the injection in-mold lamination or back injection molding process, in which the backing material is injected onto the rear side of the decorative material in the already closed mold, into which the decorative material was previously placed.

Such a compression and/or injection in-mold lamination process can be used to produce a backing layer suitable for a decorative material. The one-piece production of this backing layer, which moreover borders the edge of the decorative material, would compensate for the cutting-to-size tolerances in the decorative material and simplify production by eliminating the operation of adhesively attaching for example a carpet. However, a great problem which arises here is the positioning or secure holding of the edge of the decorative material in the cavity of a mold for compression or injection in-mold lamination. The displacement of the filled plastics material melt caused by the pressing force can, for example, cause the edge of the decorative material to be compressed or raised in an unpredictable way, so this edge may be made to shift onto the surface of the border because it is displaced by the backing material. A neatly formed border which covers the edge of the decorative material reliably and completely consequently cannot be ensured.

FR 1 496 387 and GB 2 103 534 disclose processes and apparatuses for the injection in-mold lamination of a decorative material and for the bordering of the edges of the latter. The decorative material is in each case held—during a first injection phase—against displacement. Movable, sprung or retractable feelers, which are moved away by the pressure of the injected plastic or by the decorative material acting on them from the outside, serve as holding means. While in the case of FR 1 496 387 the decorative material is held at its corners, the holding means in GB 2 103 534 act on the surface of the decorative material.

SUMMARY OF THE INVENTION

The object of the invention is to provide an apparatus and a process for the compression and/or injection in-mold lamination of decorative materials, such as carpets, textiles or films, and for the bordering of at least part of the edge of these decorative materials with a backing material in the form of a flowable compound, with which apparatus and process the edge of this decorative material can be reliably held during the compression/injection in-mold lamination and while the bordering of the edges is being carried out, in order that this edge is completely enclosed by the border.

This object and others to become apparent as the specification progresses, are accomplished by the invention, according to which, briefly stated, the apparatus for an in-mold lamination of a decorative material includes a first mold part; a pressing device forming a portion of the first mold part and being immovable with respect thereto; a second mold part defining a mold part cavity having a bottom surface; and a fixed holding device forming a portion of the second mold part and being immovable with respect thereto. The fixed holding device is raised above the bottom surface for supporting the decorative material spaced from and above the bottom surface. The pressing device faces the fixed holding device. The first mold part is movable toward the second mold part in a closing direction into a closed position for pressing the decorative material between the pressing device and the fixed holding device during in-mold lamination. In the closed position the first and second mold parts together form a closed mold cavity. The mold part cavity of the second mold part forms a portion of the closed mold cavity.

Advantages of the invention over the prior art comprise the possibility of reliably bordering even decorative materials which have a complicated or irregular spatial form.

The proposed holding means, which are fixed—i.e. immovable with respect to the surface of the cavity on which these holding means are arranged—represent a simple device. Not only can they be produced more cost-effectively in comparison with the sprung or retractable feelers in the apparatuses of the prior art, but it can also be expected from the proposed solution that they are less susceptible to faults than the apparatuses in the prior art.

The following figures concern the schematic representation of embodiments by way of example, which show individual aspects of the apparatus according to the invention and of the process according to the invention. Any desired combinations of these aspects lead to further embodiments, which are likewise covered by the idea of the invention. These figures consequently do not in any way restrict the scope of the invention. In the figures:

BRIEF DESCRIPTION OF THE DRAWINGS

FIGS. 1A, 1B and 1C show schematic sectional representations of two embodiments of the invention, for explaining the difference in principle between injection in-mold lamination and compression in-mold lamination; wherein FIG. 1A illustrates the opened mold for injection in-mold lamination; FIG. 1B shows the closed mold for injection in-mold lamination or compression in-mold lamination; and FIG. 1C illustrates the opened mold for compression in-mold lamination or injection in-mold lamination;

FIGS. 8A, 8B and 8C show a component with a decorative material which is bonded with a backing material over its surface area and is at least partly enclosed completely by a border at the edge; wherein FIG. 8A illustrates the backing material and the edge border consisting of the same material; FIG. 8B shows the edge border being formed such that it is hollow and the material of which was introduced in a different way than the remaining backing material; and FIG. 8C illustrates the edge border being designed as a sealing lip having an undercut and consisting of a different material than the backing material; and FIGS. 9A and 9B show comb-like combinations of holding means designed as needles.

DESCRIPTION OF THE PREFERRED EMBODIMENTS

Figure 1A:
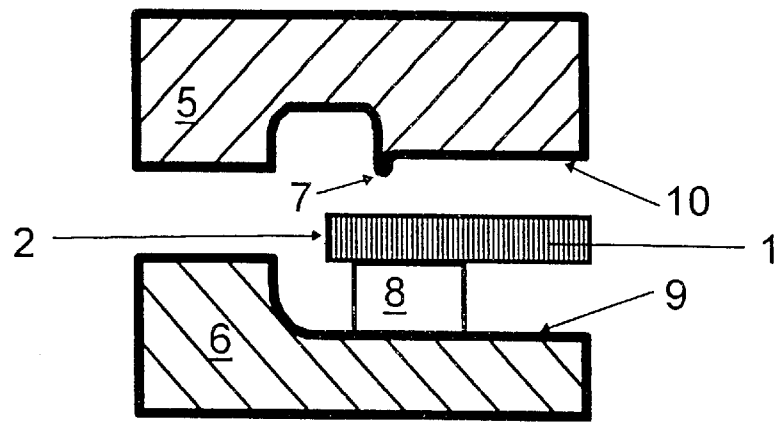
Figure 1B:
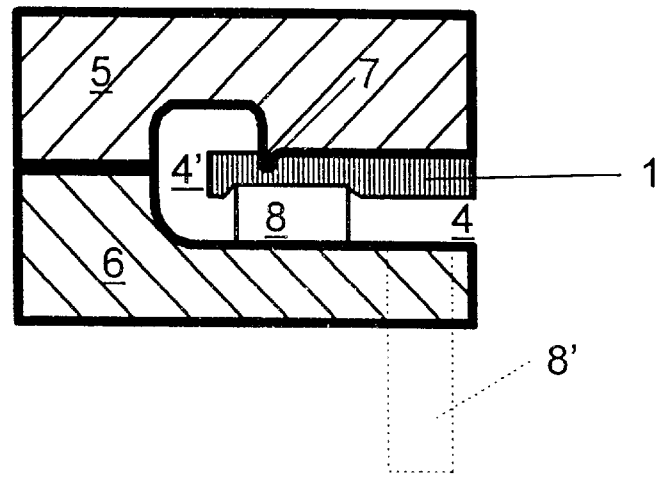
Figure 1C:
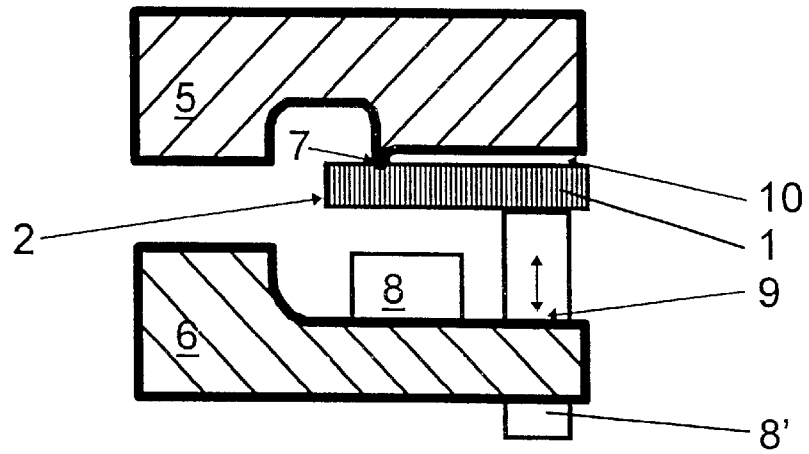

FIG. 1 shows an apparatus for the injection in-mold lamination, or for the compression and/or injection in-mold lamination, of a decorative material 1 and for the bordering of at least part of the edge 2 of this decorative material with a backing material 3. Such an apparatus comprises at least two mold parts 5, 6—forming a cavity 4, 4'. A first mold part 5 comprises pressing means 7 and a second mold part 6 comprises holding means 8 for holding a decorative material 1, placed into the cavity 4, 4', at a distance from a surface 9 of the cavity formed by the second mold part 6. These holding means 8 are raised with respect to this surface 9 and are arranged entirely within the cavity 4, 4' and immovably with respect to the surface 9 of the latter. The pressing means 7 are designed and arranged such that the decorative material 1 is pressed by them onto the holding means 8—at least in the vicinity of the edge 2—at least during the compression and/or injection in-mold lamination.

Before the injection in-mold lamination (FIGS. 1A and 1B), the decorative material 1 is placed into the cavity 4, 4' and onto the holding means 8. The mold is then completely closed, which has the effect that the decorative material 1 is clamped between the pressing means 7 and the holding means 8 at least in the vicinity of its edge, but preferably not directly at the edge. The decorative material is then held so securely that it cannot slip during the injection of the flowable plastics compound. During the injection or injection in-mold lamination, the plastics material presses the decorative material upward against the pressing means 7 and the surface 10, so that the plastics compound cannot flow onto the upper side of the decorative material 1. Apparatuses for injection in-mold lamination may—as a departure from the representation in FIG. 1—assume any desired spatial position, so that the relationships below and above must be understood only as descriptive and not restrictive. Before compression in-mold lamination (FIGS. 1C and 1B), the decorative material 1 is placed into the cavity 4, 4' and onto additional, movable holding means 8', which hold the decorative material so far above the surface 9 that plastics compound can be introduced into the mold without said compound touching the decorative material. These movable holding means 8' are preferably arranged further away from the edge of the decorative material than the fixed holding means 8. After introducing the plastics compound, the mold—which has vertical flash faces (not shown), which are known per se and make it possible for the mold to be closed before the plastics compound is displaced by the pressing force caused by the mold parts 5, 6 moving completely together—is fully closed. This has the effect that the decorative material 1 is clamped between the pressing means 7 and the fixed holding means 8, at least in the vicinity of its edge (but preferably not directly at the edge), and the plastics compound is distributed by the closing pressure. The decorative material is then held so securely that it cannot slip during the compression in-mold lamination of the flowable plastics compound. It goes without saying that the apparatus according to FIG. 1C can also be used for injection in-mold lamination. Apparatuses for compression in-mold lamination can—as a departure from the representation in FIG. 1—assume such a spatial position that the mold halves are moved horizontally toward each other.

Figure 2:
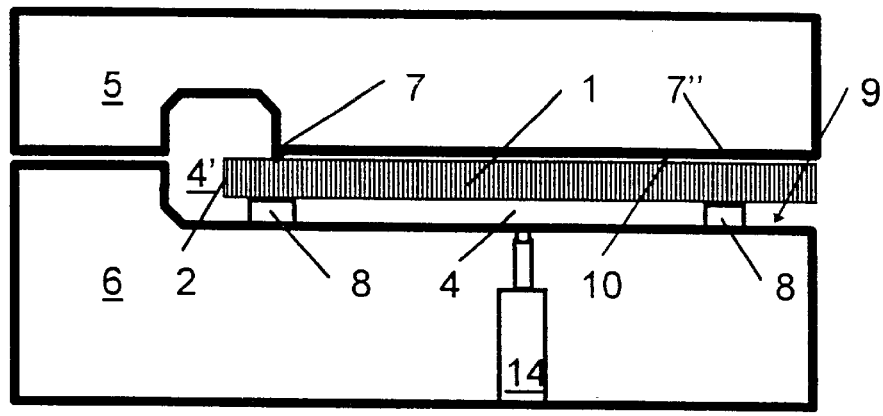
FIG. 2 shows a closed apparatus, according to a first embodiment, before injection in-mold lamination with a backing material.

A first embodiment of the apparatus according to the invention is represented in FIG. 2 and comprises holding means 8, which are fixedly connected to the second mold part 6. These holding means 8 are consequently suitable for securely holding in the closed mold a placed-in decorative material 1, in order that the edge 2 can be completely enclosed by a border during the injection in-mold lamination. The holding means 8 are arranged such that the decorative material is pressed against the pressing means 7, at least in the vicinity of its edge 2. Preferably, the pressing means 7 is designed as a fixed blade, which brings about a relatively high contact pressure and consequently a pinching together of the decorative material 2 (cf. FIG. 1B). If required, for example because of the size or shape of the decorative material, further fixed holding means 8 may be provided, also holding the decorative material in zones away from the edge against the mold surface 10, likewise acting as a pressing means 7". 14 denotes a needle valve nozzle, via which the plastics compound can be injected into the cavity 4, 4'.

Figure 3:
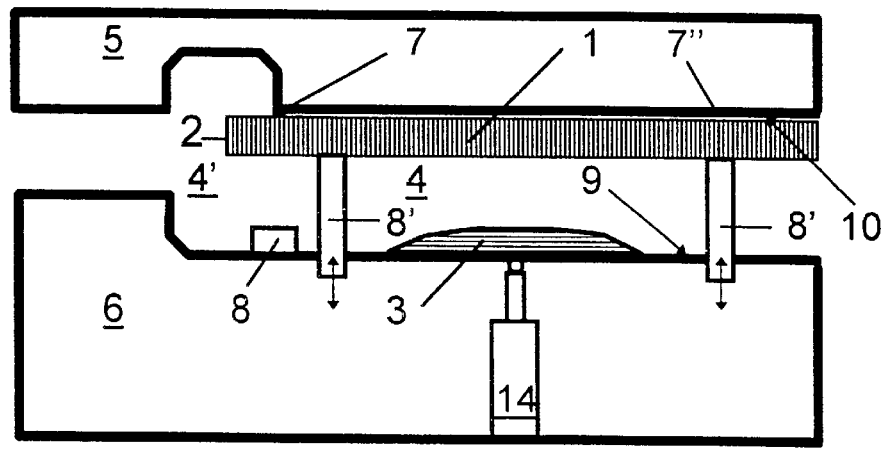
FIG. 3 shows a partly opened apparatus, according to a second embodiment, during the injection of a backing material by means of the melt-flow method and subsequent compression in-mold lamination.

The apparatus according to a second embodiment of the invention is represented in FIG. 3. This mold comprises a first mold part 5 and a second mold part 6. These two mold parts together define a cavity 4, 4'. The mold has been partly opened, so that backing material 3 can be brought into the cavity 4 as a flowable plastics compound and—to prepare for the compression in-mold lamination operation—applied to the surface 9 of the second mold part 6. This preferably takes place without the backing material being able to come into contact with the decorative material 1. Additional holding means 8' are designed for this purpose such that they are movable (marked by double-headed arrow) over such a large distance that, when the mold is partly opened, an adequately large distance can be maintained between the decorative material 1 pressed against the surface 10 of the first mold part 5 and the backing material 3 applied to the surface 9 of the second mold part 6. The fixed holding means 8 are arranged such that the decorative material is pressed against the pressing means 7, at least in the vicinity of its edge 2. If required, for example because of the size or shape of the decorative material, further movable holding means 8' may be provided, also holding the decorative material in zones away from the edge against the mold surface 10, likewise acting as a pressing means 7".

In this situation, the decorative material 1 is placed in its finished form into the apparatus. The backing material 3 may then be applied to the surface 9 of the cavity 4, for example by means of a pivotable slot die (layer application method, not shown) or by means of at least one needle valve nozzle 14 (melt-flow method, see FIG. 3). The mold is then closed and the backing material is thereby distributed uniformly in the zones 4 and 4' of the cavity by the contact pressure and is pressed in surface-area contact with the rear side of the decorative material 1. The decorative material 1, in particular its edge 2, is held during the closing of the mold by means of the movable holding means 8' against the surface 10 of the first mold part 5 and by means of the fixed holding means 8 in the region of the edge 2. This achieves the effect that it retains its position within the cavity in such a way that the part of the edge 2 to be bordered always protrudes into the zone 4' of the cavity and is consequently flowed around completely by the backing material 3. In principle, it is sufficient to design the location of the first mold part 5 designated as pressing means 7 as a simple edge.

In order that the decorative material is held even more securely, this location 7 may be designed as a blade, rake or similar structure which reduces the contact area with the decorative material 1 and is raised above the surface 10 of the first mold part 5.

Figure 4:
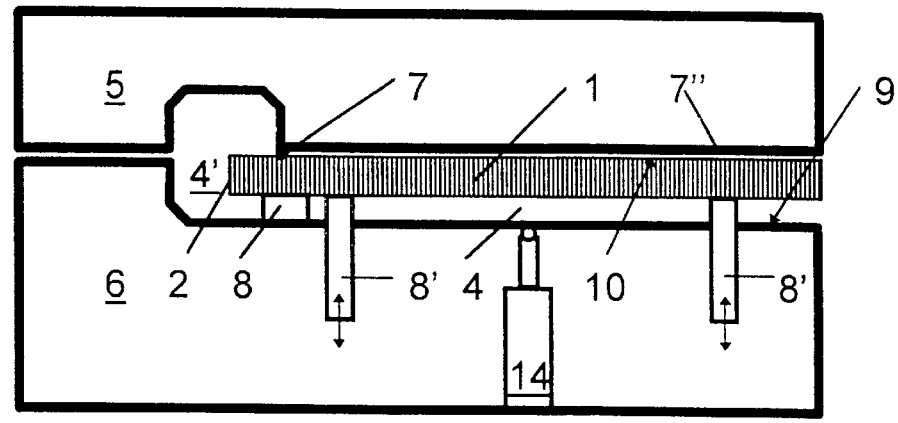
FIG. 4 shows a closed apparatus, according to a second embodiment, before injection in-mold lamination with a backing material.

FIG. 4 shows a second embodiment of the apparatus according to the invention, in the closed position. The backing material in the form of a flowable plastics compound is about to be injected through the at least one needle valve nozzle 14. As this takes place, the fixed holding means 8 hold the decorative material 1—preferably uniformly, but at least in its region near the edge—against the surface 10 of the first mold part 5, so that it is held securely in the desired position during the injection in-mold lamination. The holding force with which the additional, movable holding means 8' press the decorative material against the surface 10 of the first mold part 5 is preferably adjustable.

The movable holding means 8' may also be designed such that they can be withdrawn during the injection in-mold lamination or during the displacement caused by the pressing force.

Figure 5:
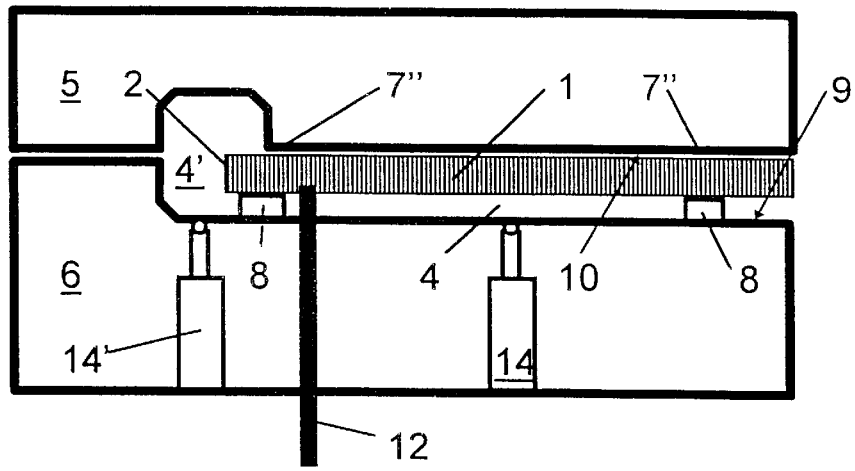
FIG. 5 shows a closed apparatus, according to a third embodiment, before injection in-mold lamination with two backing materials.

A third embodiment of the apparatus according to the invention is represented in FIG. 5 and comprises holding means 8, which are fixedly connected to the second mold part 6. These holding means 8 are consequently suitable for securely holding in the closed mold a placed-in decorative material 1, in order that the edge 2 can be completely enclosed by a border during the injection in-mold lamination. This third embodiment differs from the previous embodiments essentially by having at least one slide 12, with which the zone 4' of the cavity which serves for the bordering of the edge 2 of the decorative material 1 can be shut off with respect to the zone 4 of the cavity in which the decorative material is subjected to compression and/or injection in-mold lamination over its surface area. The use of this slide makes possible a neat transitional zone between two different backing materials 3', 3", which are brought into the cavity one after the other. The slide may be designed such that it is straight, parallel to the edge of the decorative material, or curved, but may also have a shape which is curved or serrated to such an extent that a denticulation is produced between the two backing materials 3', 3". This third embodiment also makes it possible for the zone 4 of the cavity to be filled as desired by means of compression in-mold lamination or injection in-mold lamination of the decorative material and the zone 4' to be filled with the same or another backing material for bordering the edge by injection molding. Referred to here as other backing materials 3" are plastics which have a different composition and/or a different strength from that of the backing material 3' applied over the surface area by compression/injection in-mold lamination.

Figure 6:
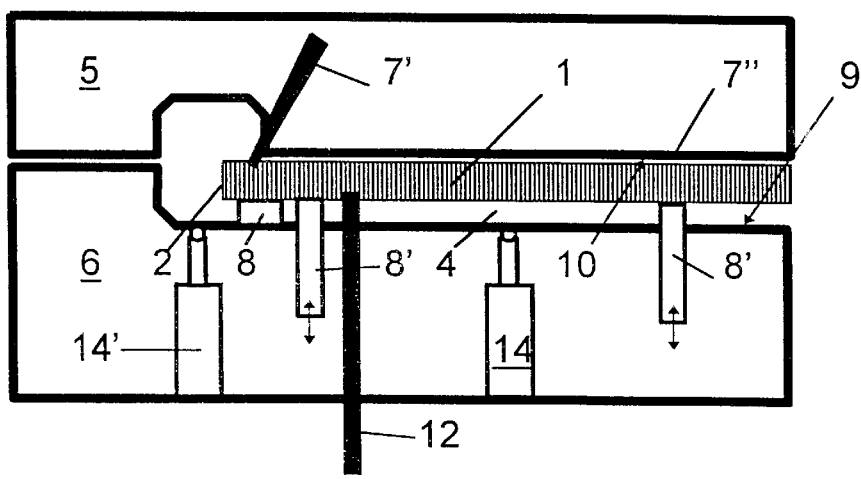
FIG. 6 shows a closed apparatus, according to a fourth embodiment, before injection in-mold lamination with two backing materials.

A fourth embodiment of the apparatus according to the invention is represented in FIG. 6. This essentially combines the embodiments 2 and 3. The fixed holding means 8 are arranged such that the decorative material 1 is pressed against the pressing means 7', designed here as a slide, at least in the vicinity of its edge 2. With the aid of this slide, a so-called undercut 18 (see also FIG. 8C) can be produced in the region of the transition of the edge border of backing material 3 to the decorative material 1. In this way, impressions attributable to the action of a pressing means 7, 7' in the vicinity of the edge 2 of the decorative material can be successfully masked. If the surface 10 of the first mold part 5 is used as the pressing means 7", this problem of impressions in the decorative material is less pronounced. In order, however, to produce even fewer impressions on the front side of the decorative material, needles are preferably used as the movable holding means 8'. However, in order that the decorative material can be effectively held, these needles are to have at least two points, which are interconnected such that the decorative material is not simply pierced by the entire needle.

Figure 7:
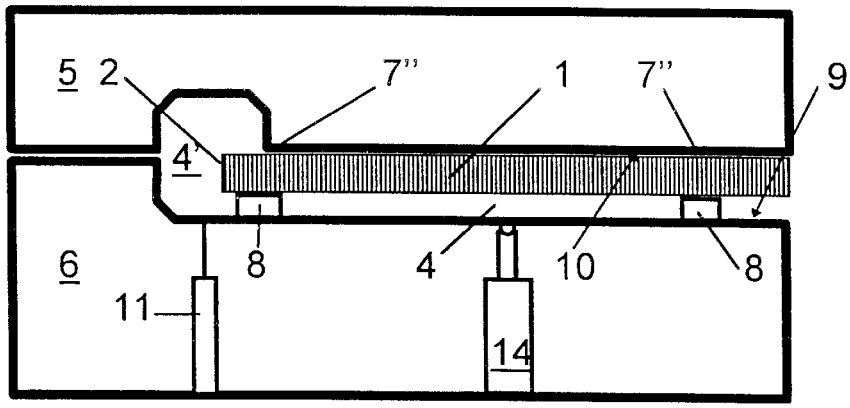
FIG. 7 shows a closed apparatus, according to a fifth embodiment, before injection in-mold lamination with a backing material by means of the internal gas pressure method.

FIG. 7 shows a fifth embodiment of the apparatus according to the invention. This differs from the previous embodiments essentially by having at least one gas inlet 11, with which the zone 4' of the cavity, which serves for the bordering of at least part of the edge 2 of the decorative material 1, can be filled using the so-called internal gas pressure method (IGP method). If the apparatus is fitted with holding devices 8' which are movable over a relatively large distance (cf. FIGS. 1C, 3, 4 and 6), it is suitable for the compression and/or injection in-mold lamination of the decorative material. If the apparatus is fitted with fixed holding devices 8, it is suitable for the injection in-mold lamination of the decorative material 1. Whether or not the zone 4' is separated by a slide 12 from the zone 4 of the cavity, the zone 4' of the cavity is always completely filled with plastics melt in a first phase of the IGP method. In a second phase—after the plastics melt in contact with the mold has solidified at least partially—the still flowable core of the backing material is displaced out of the cavity 4' into an overflow vessel (not shown), preferably by introducing or forcing in a gas. Once the component—which comprises a compression and/or injection in-mold laminated decorative material 1, the edge 2 of which is at least partly enclosed completely by a border—has cured sufficiently, it can be demolded. A new decorative material is then placed into the cavity 4 of the apparatus and the next component is produced.

Figure 8A:
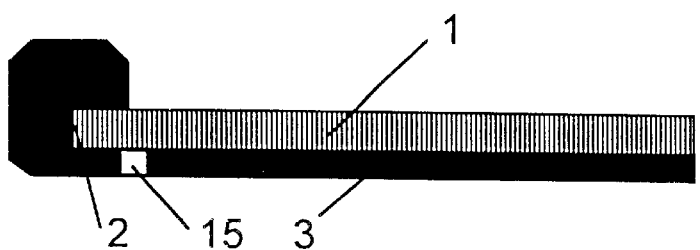

Examples of components produced by the process according to the invention or using the apparatus according to the invention are represented in FIG. 8:

FIG. 8A shows a component with a decorative material 1, which is bonded over its surface area with a backing material 3 and is at least partly enclosed at the edge 2 by a border and in which the backing material and the edge border consist of the same material. The depressions 15 near the edge are characteristic of components which are produced with the apparatuses and processes described or shown here. These depressions occur on the rear side of the backing material, at least in the regions near the edge of the bordered decorative material of the component. Their extent and arrangement essentially correspond to the extent and arrangement of the fixed holding means 8. This component was produced by means of injection in-mold lamination.

Figure 8B:
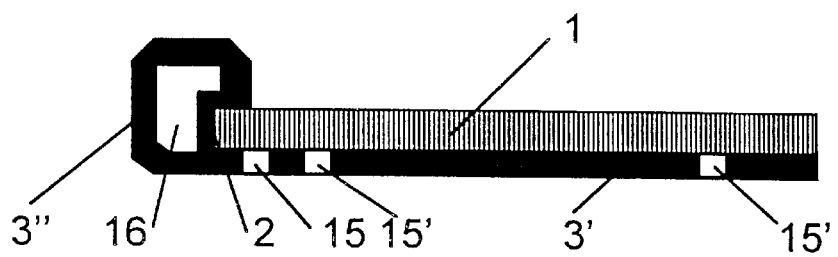

FIG. 8B shows a component of the generic type in which the edge border is designed such that it is hollow and the edge border consists of a material 3" introduced in a different way than the backing material 3'. In addition to the depressions 15 near the edge, depressions 15' away from the edge can also be seen here, these occurring because the movable holding means 8' were not withdrawn during the displacement. The backing material 3' bonded over its surface area with the decorative material 1 was processed by means of compression in-mold lamination (after introducing the plastics melt by the layer application method). The backing material 3' bordering the edge 2 of the decorative material 1 was introduced by means of injection in-mold lamination by the IGP method, so that a hollow space 16 was produced in the edge border. The transitional zone, which is of a serrated form, is located between the depressions 15 and 15' shown. The slide 12 of the apparatus was pressed against the decorative material during the compression in-mold lamination and withdrawn continuously between the mold parts in a manner corresponding to the closing of the cavity, but always remained in good contact with the decorative material. Only once the plastics material had sufficiently solidified was the slide fully withdrawn, the edge border injected and the hollow space 16 produced.

Figure 8C:
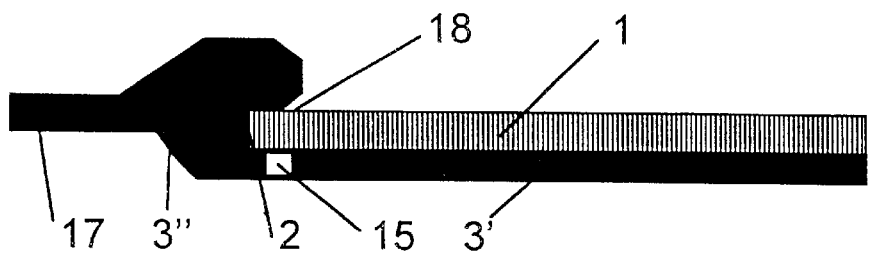
Figure 8C:
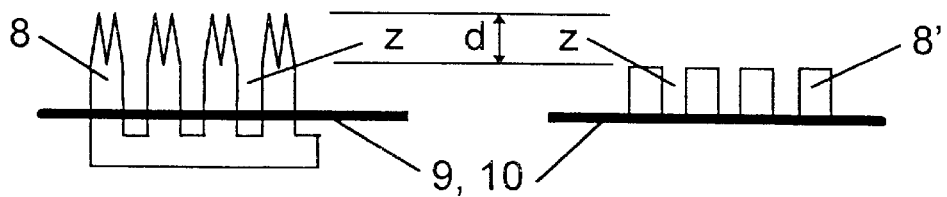

FIG. 8C shows a component of the generic type in which the edge border is designed as a sealing lip 17, has an undercut 18 and consists of a different, softer material 3" than the backing material 3'. After placing the decorative material 1 onto the fixed holding means, the mold was closed and firstly—with the slide 12 closed—the harder backing material 3', to be bonded over its full surface area with the decorative material 1, was injected into the zone 4 of the cavity. The slides, designed with a wave form, which were arranged between the holding means 15 near the edge and the holding means 15' away from the edge, were then withdrawn and the softer backing material 3" was then injected into the still empty zone 4' of the cavity. The wave form of the slides used had the effect of considerably enlarging the contact area between the two backing materials 3', 3", so that a flexible sealing lip could be molded in one piece onto the component and would not become detached from the harder backing material in spite of the high stress. An identical component—without the depressions 15' away from the edge—could also be produced by means of compression in-mold lamination if, during the last phase of the displacement caused by the pressing force, the movable holding means 8' were withdrawn flush with the surface.

Not depicted in the figures are devices known per se, such as extruders, heating and cooling lines, manifolds, vertical flash faces, pressure-relief lines etc.; these devices are provided or used as necessary by a person skilled in the art.

It goes without saying that—at least for the injection in-mold lamination—the first mold part 5 and the second mold part 6 can be interchanged and the holding means 8, 8' and the pressing means 7,7', 7" can be attached to the respectively opposite mold part. The closing movement of the apparatus according to the invention may be horizontal, vertical or deviating as desired from these two directions.

For the compression in-mold lamination of decorative material 1, an apparatus according to the second embodiment (FIGS. 2, 3) may be designed such that it is horizontally movable, so that the cavity 4, 4' runs mainly in the vertical direction, as a departure from FIGS. 1 to 7. In this case as well, the decorative material 1 is held by the movable holding means 8' against the surface of the opposite mold part, so that backing material 3 introduced into the cavity 4 by means of the melt-flow method cannot come into contact with the decorative material 1 as long as the mold is still partly opened.

In order to prevent, at least partly, the depressions 15 in the backing material 3 on the rear side of the component, it is possible, for example in compression in-mold lamination, for the movable holding means 8' to be fully or partly withdrawn in the final phase of the closing of the mold—if the displacement caused by the pressing force has already essentially filled the cavity 4, 4'. In order to produce even fewer impressions on the front side of the decorative material 1, needles are preferably used as the movable holding means 8'. However, in order that the decorative material can be effectively held, these needles are to have at least two points, which are interconnected such that the decorative material is not simply pierced by the entire needle. Especially preferred are also comb-like combinations of needles, the individual points of which (see FIG. 9A) are not longer than the thickness d of the decorative material to be held. Such combs offer the advantage, moreover, that, if they are to be designed as movable holding means 8', they can be moved by simple means which interact with the combs outside the cavity 4. The intermediate spaces z between the needles are arranged more or less far apart, in a manner corresponding to the decorative material used, so that the backing material can pass through these intermediate spaces z and completely fill the zone 4' of the cavity between the mold parts 5, 6. As shown in FIG. 9B, blunt needles may also be used, these being shorter, for example by precisely the thickness d of the decorative material, than the pointed needles and also spaced apart by intermediate spaces z. The depressions 15 produced on the rear side of the component in the backing material 3 by the fixed holding means 8 near the edge do not mar the appearance of such a component, since they are generally arranged out of sight from the user—as in the example of components designed as map pockets on the insides of car doors. If needles have points, they hold the decorative material extremely well in place; it may therefore be advantageous to design the needles in a correspondingly flexible form, in order to allow compensation for small movements and deformations of the decorative material.

All plastics suitable for a compression and/or injection in-mold lamination process, that is to say thermoplastics or permanently flexible polymers such as for example polypropylene, ABS copolymers (acrylonitrile-butadiene-styrene copolymers) or thermoplastic rubbers etc., come into consideration as materials. These plastics may also be reinforced for example with fibers or mats. To increase the strength or hardness, the backing materials laminated with the decorative material over the full surface area by compression in-mold lamination may comprise reinforcements or added fillers. In this case, differently colored decorative materials and/or plastics with a different texture are also often used. As a departure from the processes and materials described, other flowable or pasty compounds may also be used in the production of components according to the invention.

The following are mentioned as representative, and in no way exhaustive, examples of applications for the use of the apparatuses and processes according to the invention:

lining or covering elements in means of transport (for example in cars, buses, trams, railways, ships or aircraft) comprising in particular map pockets, pillar trim (with or without connections for window glass), floor carpets, coverings of floors and walls of the trunk floor and trunk lid.

Seating for mass means of transport, in particular seat shells and rests.

Cladding elements in building construction, in particular baseboards covered with carpet for rooms in residential and office buildings, as well as carpets provided with surrounds on stairs and in doorways.

What is claimed is:

1. An apparatus for the compression and/or injection in-mold lamination of a decorative material (1) and for the bordering of at least part of the edge (2) of this decorative material with a backing material (3), which apparatus comprises at least two mold parts (5, 6)—forming a cavity (4, 4'); a first mold part (5) comprising pressing means (7, 7', 7") and a second mold part (6) comprising holding means (8) for holding a decorative material (1), placed into the cavity (4, 4'), at a distance from a surface (9) of the cavity formed by the second mold part (6), and these holding means (8) being raised with respect to this surface (9), characterized in that the holding means (8) and the pressing means (7, 7', 7") are arranged entirely within the cavity (4, 4') and respectively immovably with respect to the surface (9 or 10) of the latter and in that the pressing means (7,7', 7") are designed and arranged respectively directly opposite the holding means (8) in the closing direction of the apparatus such that the decorative material (1) is pressed between the holding means (8) and the pressing means (7, 7', 7")—at least in the vicinity of the edge (2)—at least during the compression and/or injection in-mold lamination.

2. A process for the compression in-mold lamination of a decorative material (1) and for the bordering of at least part of the edge (2) of this decorative material with a backing material (3) by using an apparatus which comprises at least two mold parts (5, 6)—forming a cavity (4, 4'); a first mold part (5) comprising pressing means (7, 7', 7") and a-second mold part (6) comprising holding means (8) for holding a decorative material (1), placed into the cavity (4, 4'), at a distance from a surface (9) of the cavity formed by the second mold part (6) and these holding means (8) being raised with respect to this surface (9), characterized in that these holding means (8) and pressing means (7, 7', 7") are arranged entirely within the cavity (4, 4'), respectively immovably with respect to the surface (9 or 10) of the latter and directly opposite one another in the closing direction of the apparatus, a decorative material (1) being placed into the cavity (4, 4'), the decorative material being held at a distance from this surface (9) by movable holding means (8'), which are raised with respect to a surface (9) of the cavity formed by the second mold part (6), and the decorative material (1) being pressed by means of the pressing means onto the holding means (8)—at least in the vicinity of the edge (2)—at least during the compression in-mold lamination.

3. A process for the injection in-mold lamination of a decorative material (1) and for the bordering of at least part of the edge (2) of this decorative material with a backing material (3) by using an apparatus which comprises at least two mold parts (5, 6)—forming a cavity (4, 4'); a first mold part (5) comprising pressing means (7, 7', 7") and a second mold part (6) comprising holding means (8) for holding a decorative material (1), placed into the cavity (4, 4'), at a distance from a surface (9) of the cavity formed by the second mold part (6) and these holding means (8) being raised with respect to this surface (9), characterized in that these holding means (8) and pressing means (7, 7', 7") are arranged entirely within the cavity (4, 4'), respectively immovably with respect to the surface (9) of the latter and directly opposite one another in the closing direction of the apparatus, a decorative material (1) being placed into the cavity (4, 4') and the cavity being closed, so that the decorative material (1) is pressed by means of the pressing means (7, 7', 7") onto the holding means (8)—at least in the vicinity of the edge (2)—at least during the injection in-mold lamination.

4. An apparatus for an in-mold lamination of a decorative material, comprising
    (a) a first mold part;
    (b) pressing means forming a portion of said first mold part and being immovable with respect thereto;
    (c) a second mold part defining a mold part cavity having a bottom surface; and
    (d) fixed holding means forming a portion of said second mold part and being immovable with respect thereto; said fixed holding means being raised above said bottom surface for supporting the decorative material spaced from and above said bottom surface; said pressing means facing said fixed holding means; said first mold part being movable toward said second mold part in a closing direction into a closed position for pressing the decorative material between said pressing means and said fixed holding means during in-mold lamination; in said closed position said first and second mold parts together forming a closed mold cavity; said mold part cavity of said second mold part forming a portion of said closed mold cavity; said pressing means and said fixed holding means being situated in their entirety in said closed mold cavity.

5. The apparatus as defined in claim 4, wherein said mold cavity includes a lateral bordering edge; and further wherein said fixed holding means and said pressing means are spaced from said lateral bordering edge.

6. The apparatus as defined in claim 4, further comprising movable holding means displaceably supported in said second mold part for supporting the decorative material in an open state of the apparatus.

7. The apparatus as defined in claim 6, wherein said movable holding means are constituted by one of a plurality of pins each having two points, a plurality of cams, a plurality of ribs and a plurality of columns.

8. The apparatus as defined in claim 6, wherein said movable holding means include a plurality of holding components interconnected to form a group.

9. The apparatus as defined in claim 4, wherein said pressing means constitutes a blade.

10. The apparatus as defined in claim 4, wherein said pressing means forms a surface of said first mold part inside said mold cavity.

11. The apparatus as defined in claim 4, further comprising a gas inlet opening into said mold cavity.

12. The apparatus as defined in claim 4, further comprising a slide dividing said mold cavity into a first zone for subjecting the decorative material to one of injection and compression in-mold lamination over a surface area of the material and into a second zone for forming a border of an edge of the decorative material.

13. The apparatus as defined in claim 12, further comprising injection nozzles opening into said first and second zones, respectively, for injecting a backing material into said first and second zones.

14. A process for the compression in-mold lamination of a decorative material and for an at least partial bordering of an edge of the decorative material with a backing material, performed by the apparatus defined in claim 6, comprising the following steps:

(a) positioning said movable holding means such that a material supporting face thereof is spaced from said bottom surface of said second mold part;

(b) placing the decorative material on the supporting face of said movable holding means;

(c) introducing the backing material into said mold cavity in contact with said bottom surface of said second mold part and out of contact with the decorative material supported on said movable holding means;

(d) pressing the decorative material against said fixed holding means by said pressing means in an edge region of the decorative material; and (e) laminating the backing material to said decorative material in said mold cavity by applying compression.

15. The process as defined in claim 14, further comprising the step of forcing a gas into said mold cavity for producing a hollow space in the backing material.

16. The process as defined in claim 14, further comprising the step of withdrawing said movable holding means from the decorative material prior to said laminating step.

17. A process for the injection in-mold lamination of a decorative material and for an at least partial bordering of an edge of the decorative material with a backing material, performed by the apparatus defined in claim 4, comprising the following steps:

(a) placing the decorative material into the mold cavity on said fixed holding means above and spaced from said bottom surface of said second mold part while the first and second mold parts are separated from one another to assume an open position;

(b) moving the first and second mold parts into a closed position whereby the decorative material is pressed against the fixed holding means by said pressing means in an edge region of the decorative material; and (c) injecting into the closed mold the backing material between the decorative material and said first surface, whereby the backing material is laminated to the decorative material.

18. The process as defined in claim 17, further comprising the step of forcing a gas into said mold cavity for producing a hollow space in the backing material.

19. A component with a decorative material (1) which is bonded over its surface area with a backing material (3) and is at least partly bordered at the edge (2) by means of the process according to claim 17.

20. The component as claimed in claim 19, characterized in that the backing material (3) comprises a hard part (3') and a soft part (3").

21. The component as claimed in claim 20, characterized in that the soft part (3") of the backing material (3) comprises a sealing lip (17).

22. The component as claimed in claim 13, characterized in that the backing material (3) which is applied to the decorative material (1) over its surface area by injection in-mold lamination and which borders at least part of the edge (2) is molded onto the decorative material (1) in one piece.

23. A component with a decorative material (1) which is bonded over its surface area with a backing material (3) and is at least partly bordered at the edge (2) by means of the process according to claim 14.

24. The component as claimed in claim 23, characterized in that the backing material (3) comprises a hard part (3') and a soft part (3").

25. The component as claimed in claim 24, characterized in that the soft part (3") of the backing material (3) comprises a sealing lip (17).

26. The component as claimed in claim 23, characterized in that the backing material (3) which is applied to the decorative material (1) over its surface area by compression in-mold lamination and which borders at least part of the edge (2) is molded onto the decorative material (1) in one piece.

* * * * *